United States Patent
Liu et al.

(10) Patent No.: US 8,631,270 B2
(45) Date of Patent: Jan. 14, 2014

(54) METHOD, DEVICE FOR RUNNING INTERNET PROTOCOL TELEVISION SERVICE SYSTEM, AND INTERNET PROTOCOL TELEVISION SERVICE SYSTEM

(75) Inventors: Yu Liu, Shenzhen (CN); Hao Liu, Shenzhen (CN); Yinlong Wang, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 0 days.

(21) Appl. No.: 13/394,198

(22) PCT Filed: Jun. 25, 2010

(86) PCT No.: PCT/CN2010/074533
§ 371 (c)(1),
(2), (4) Date: Mar. 5, 2012

(87) PCT Pub. No.: WO2011/026370
PCT Pub. Date: Mar. 10, 2011

(65) Prior Publication Data
US 2012/0166865 A1    Jun. 28, 2012

(30) Foreign Application Priority Data
Sep. 7, 2009    (CN) .......................... 2009 1 0171833

(51) Int. Cl.
*G06F 11/00*    (2006.01)
(52) U.S. Cl.
USPC ....................................................... 714/4.11
(58) Field of Classification Search
USPC ........................................................ 714/4.11
See application file for complete search history.

(56) References Cited

U.S. PATENT DOCUMENTS

| | | | |
|---|---|---|---|
| 2006/0047791 A1* | 3/2006 | Bahl | 709/220 |
| 2009/0019161 A1 | 1/2009 | Li et al. | |
| 2009/0019493 A1* | 1/2009 | Li et al. | 725/49 |

FOREIGN PATENT DOCUMENTS

| | | |
|---|---|---|
| CN | 1863308 A | 11/2006 |
| CN | 101064841 A | 10/2007 |
| CN | 101119474 A | 2/2008 |
| CN | 101242228 A | 8/2008 |
| CN | 101645791 A | 2/2010 |
| EP | 1251656 A1 | 10/2002 |
| WO | 03026279 A2 | 3/2003 |

OTHER PUBLICATIONS

International Search Report for PCT/CN2010/074533 dated Sep. 25, 2010.
Can Yang et al."Design and Implementation of a Novel Roboticized EPG System of Network TV", Proceedings of the Eighth International Conference on Machine Learning and Cybernetics, Baoding, Jul. 12-15, 2009, pp. 1516-1522 XP31517865.

* cited by examiner

*Primary Examiner* — Yair Leibovich
(74) *Attorney, Agent, or Firm* — Ling Wu; Stephen Yang; Ling & Yang Intellectual Property LLC

(57) ABSTRACT

The present invention discloses a method, apparatus and system for operating an internet protocol television service system. The present invention relates to communication field, and solves the problem of poor quality of service caused by using a cold backup electronic programmer guide (EPG) server or transferring a user to other EPG server. The method includes: a backup electronic programmer guide (EPG) server receiving an obtaining instruction message sent by a service control manager, wherein the obtaining instruction message instructs the backup EPG server to obtain service information of a failed present network EPG server; the backup EPG server obtaining the service information of the failed present network EPG server according to the obtaining instruction message, and sending an obtaining response message to the service control manager after finishing obtaining the service information.

6 Claims, 4 Drawing Sheets

METHOD, DEVICE FOR RUNNING INTERNET PROTOCOL TELEVISION SERVICE SYSTEM, AND INTERNET PROTOCOL TELEVISION SERVICE SYSTEM

TECHNICAL FIELD

The present invention relates to the communication field, and particularly to a method, apparatus for operating an internet protocol television service system and the internet protocol television service system.

BACKGROUND OF THE RELATED ART

With the development of network and multimedia technology, the Internet Protocol Television (IPTV) is accepted by more and more users because of advantages thereof such as convenience, intelligence and controllability. Larger pressure and increasing abnormalities of the system brought by the increasing of users becomes a problem that the IPTV system has to face and solve. The Electronic Programmer Guide (EPG) is an important component of the IPTV system, to provide an operational interface to the user, and the user may obtain preferred channel or program and so on by the EPG. If an exception occurs to the EPG server, the IPTV system cannot provide service for the user normally.

In a Content Delivery Network (CDN) where the IPTV system operates practically, the networking structure of the network generally comprise multiple layers of CDN nodes. The CDN nodes are layered in the CDN network system, wherein, CND nodes in the first layer are usually center nodes, and a primary EPG server generally belongs to center nodes. Each CDN node comprises a respective EPG server, a service proxy (CDN Agent) and a Streaming media Server (SS), the EPG server displays information such as channel, program to a terminal user. The EPG server stores the content number corresponding to each media content file and the channel number corresponding to each channel. The CDN Manager of the content delivery system is responsible for managing all of the CDN nodes.

In the existing system, if an exception occurs in an EPG server of a certain node, the users to this node may be scheduled to another node to accept the service; or some EPG servers may be added to the center nodes as cold backup servers, and when an EPG server fails, the service in the failed EPG server is switched to a cold backup server, which continues to provide the service.

The following problems exist during the process of dealing with the above-mentioned EPG server fault.

If the users to the failed EPG server are transferred to another EPG server, the load on the another EPG server will be increased, so that the quality of service provided by the another EPG server is influenced; if a cold backup EPG server is used, the cold backup EPG service needs to be online to be the EPG server of this node by manual configuration when a fault occurs in an EPG server in a certain node, during this process, it is required that a network manager warns in time and the engineering staff configures the switch manually, which needs to consume a long time and thus influencing the quality of service.

SUMMARY OF THE INVENTION

The present invention provides a method, apparatus for operating an internet protocol television service system and the internet protocol television service system, which solves the problem of poor service quality caused by using a cold backup electronic programmer guide (EPG) server or transferring users to other EPG server.

A method for operating an internet protocol television service system comprises:

a service control manager receiving a present network electronic programmer guide (EPG) server failure message sent by a content management system, wherein, information of a backup EPG server distributed for the failed present network EPG server is carried in the present network EPG server failure message;

the service control manager sending an obtaining instruction message to the backup EPG server to instruct the backup EPG server to obtain service information of the failed present network EPG server; and the service control manager, after receiving an obtaining response message sent by the backup EPG server, sending a switching notification to the content management system to instruct the content management system to send internet protocol television service data of the failed present network EPG server through the backup EPG server.

The method further comprising:

if the service control manager has not received the obtaining response message in a response duration, the service control manager give up using the backup EPG server which is thought to be out of order.

A method for operating an internet protocol television service system comprises:

a backup electronic programmer guide (EPG) server receiving an obtaining instruction message sent by a service control manager, wherein the obtaining instruction message instructs the backup EPG server to obtain service information of a failed present network EPG server; and the backup EPG server obtaining the service information of the failed present network EPG server according to the obtaining instruction message, and sending an obtaining response message to the service control manager after finishing obtaining the service information.

A method for operating an internet protocol television service system comprises:

a content management system, when detecting that a present network electronic programmer guide (EPG) server fails, distributing a backup EPG server for the failed present network EPG server; and the content management system sending an EPG server failure message to a service control manager, wherein the EPG server failure message carries information of the backup EPG server distributed for the failed present network EPG server.

The step of the content management system distributing a backup EPG server for the failed present network EPG server when detecting that the present network electronic programmer guide (EPG) server fails comprises:

the content management system, when detects that the present network EPG server fails, selecting an idle backup EPG server, and setting state of the backup EPG server as being running.

After the step of the content management system sending an EPG server failure message to the service control manager, the method further comprises:

the content management system receiving a switching notification sent by the service control manager, wherein the switching notification instructs the content management system to send internet protocol television service data of the failed present network EPG server through the backup EPG server; and the content management system sending the internet protocol television service data of the failed present network EPG server through the backup EPG server.

A service control manager comprises:

a failure message receiving module, which is configured to: receive a present network electronic programmer guide (EPG) server failure message sent by a content management system, wherein the present network electronic programmer guide (EPG) server failure message carries information of a backup EPG server distributed for the failed present network EPG server;

an instruction message sending module, which is configured to: send an obtaining instruction message to instruct the backup EPG server to obtain service information of the failed present network EPG server; and a switching notification sending module, which is configured to: after receiving an obtaining response message sent by the backup EPG server, send a switching notification to the content management system to instruct the content management system to send internet protocol television service data of the failed present network EPG server through the backup EPG server.

An electronic programmer menu (EPG) server, comprising:

an instruction message receiving module, which is configured to: receive an obtaining instruction message sent by a service control manager, wherein, the message instructs the EPG server to obtain service information of a failed present network EPG server; and a service information obtaining module, which is configured to: obtain the service information of the failed present network EPG server according to the obtaining instruction message, and send an obtaining response message to the service control manager after finishing obtaining the service information.

A content management system comprises:

a backup electronic programmer guide (EPG) server distributing module, which is configured to: when detecting that a present network EPG server fails, distribute a backup EPG server for the failed present network EPG server; and a failure message sending module, which is configured to: send an EPG server failure message to a service control manager, wherein the EPG server failure message carries information of the backup EPG server distributed for the failed present network EPG server.

An internet protocol television service system comprises a service control manager, a backup electronic programmer menu (EPG) server and a content management system;

the service control manager is configured to: receive a present network EPG server failure message sent by the content management system, wherein the EPG server failure message including information of the backup EPG server distributed for the failed present network EPG server, sending an obtaining instruction message to the backup EPG server to instruct the backup EPG server to obtain service information of the failed present network EPG server;

the backup EPG server is configured to: receive the obtaining instruction message sent by the control point master control end, wherein the obtaining instruction message instructing the backup EPG server to obtain service information of the failed present network EPG server, and obtain the service information of the failed present network EPG server according to the obtaining instruction message, and send an obtaining response message to the service control manager after finishing obtaining the service information;

the content management system is configured to: when detecting that the present network EPG server fails, distribute the backup EPG server to the failed present network EPG server, and send the EPG server failure message to the service control manager, wherein the EPG server failure message carries information of the backup EPG server distributed for the failed present network EPG server.

The example of the present invention provides a method for operating an internet protocol television service system, wherein, when a present network EPG server is detected to be out of order, a backup EPG server is distributed for the present network EPG server by a content manage system, and the initialization of the backup EPG server and the switching of service in the present network EPG server are controlled automatically by a service control manager, thereby solving the problem of poor service quality caused by the fault of the present network EPG server and improving the user experience and enhancing the network reliability.

PREFERRED EMBODIMENTS OF THE PRESENT INVENTION

In order to solve the problem of poor quality of service when the EPG server fails, an example of the present invention provides a method for operating an internet protocol television service system, and this method will be described below in detail in combination with drawings.

Figure 1:
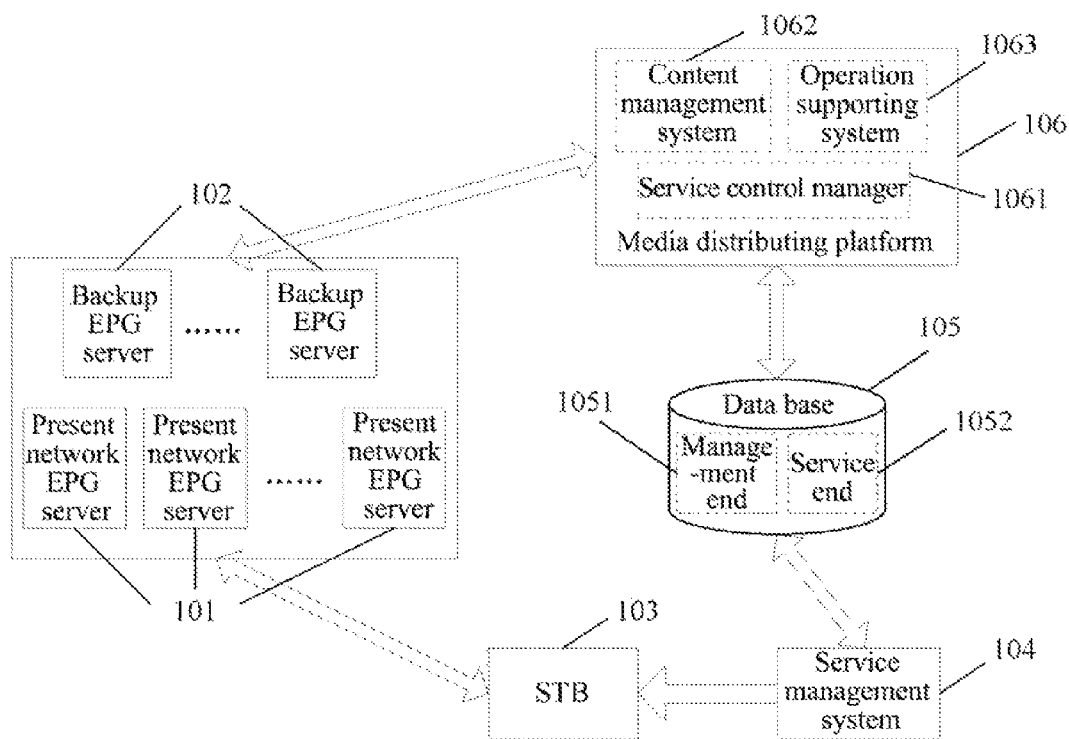
FIG. 1 is a schematic diagram of a network scenario to which an example according to the present invention is applied.

Firstly, an application scenario of the method for operating an internet protocol television service system provided according to an example of the present invention is described. As shown in FIG. 1, the application scenario comprises at least one present network EPG server 101, at least one backup EPG server 102, a user terminal Set Top Box (STB) 103, a service management system 104, a data base 105 and a media distribution platform 106. Wherein, the data base 105 further comprises a management end data base 1051 and a service end data base 1052; the media distribution platform 106 further comprises a service control manager 1061, a content management system 1062 and an operation supporting system 1063. In the example of the present invention, the present network EPG server is configured with at least one backup EPG server, specifically, one backup EPG server may be distributed to a plurality of present network EPG servers, and the home node of the backup EPG server is an empty node, and the home group thereof is a backup group.

Figure 2:
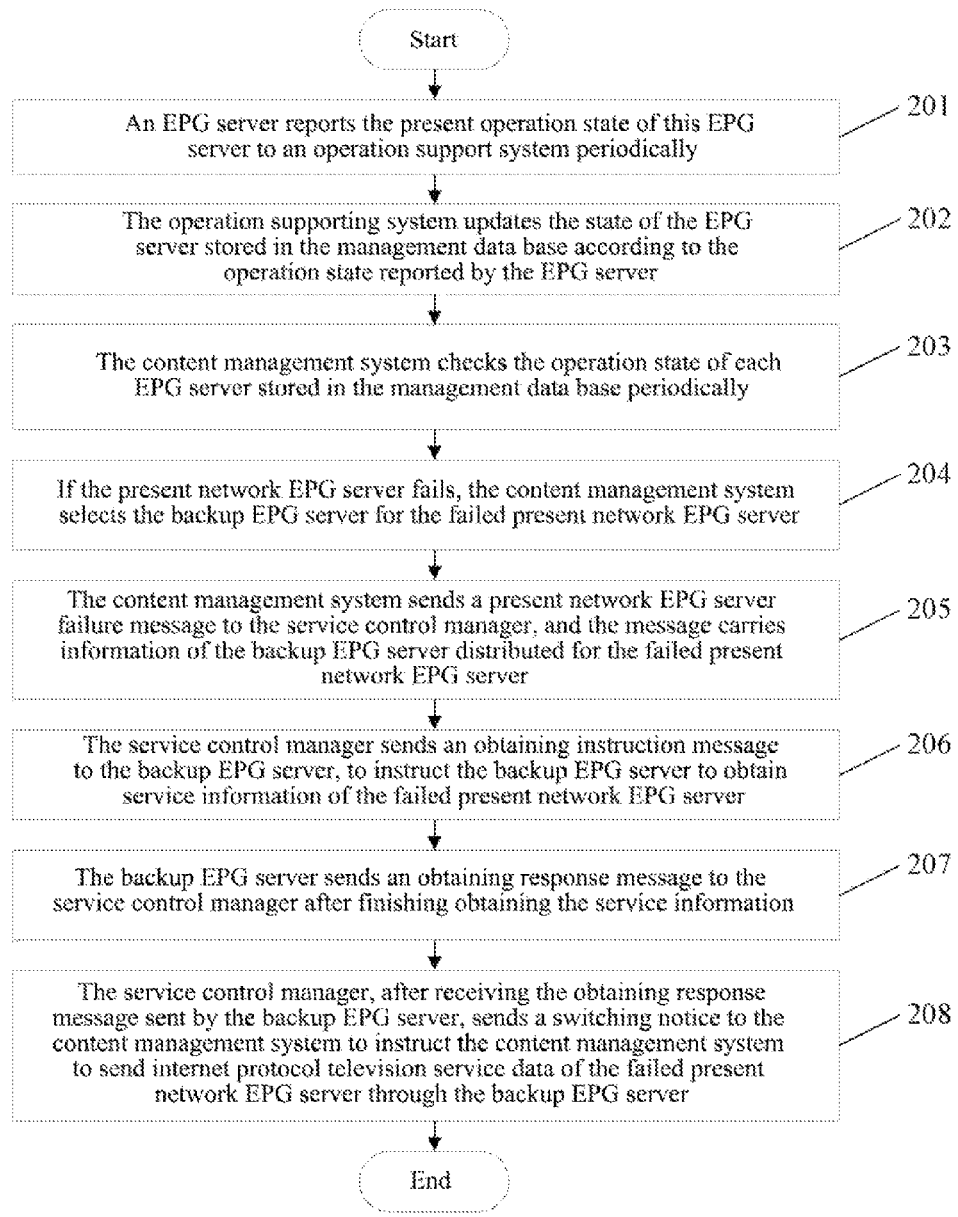
FIG. 2 is a flowchart of a method for operating an internet protocol television service system provided by an example according to the present invention.

When a present network EPG server fails, the user of the present network EPG server is needed to be transferred to other EPG server, services are continuously provided by the other EPG server. The process of accomplishing the service transfer to the other EPG server by using the method for operating the internet protocol television service system provided by the example according to the present invention is as shown in FIG. 2, which comprises the following steps.

In step 201, an EPG server reports the current operation state of this EPG server to an operation support system periodically.

When the network is initialized, each EPG server may be configured with a state reporting cycle, the each EPG server times according to the state reporting cycle and sends the current state of the EPG server once a time to the operation supporting system 1063 in each cycle.

The EPG server specifically comprises a present network EPG server and a backup EPG server.

In step 202, the operation supporting system updates the state of the EPG server stored in the management data base according to the operation state reported by the EPG server.

In this step, the operation supporting system 1063 updates the state corresponding to each EPG server stored in the management data base 1051 after receiving the operation state reported by the EPG server, wherein the state comprises state of the present network EPG server and state of the backup EPG server.

The operation supporting system 1063 updates state of the EPG in the management data base 1051 and records a reporting time which is generally the current time.

In step 203, the content management system checks the operation state of each EPG server stored in the management data base periodically.

In this step, the content management system 1062 checks the state of each EPG server stored in the management data base 1051 periodically according to a detection cycle. In general, the check cycle of the content management system 1062 is smaller than or equal to the state reporting cycle of the EPG server, so that the content management system 1062 is able to find the change of the operation state of the EPG server.

When the content management system 1062 checks the state of each EPG server, it is also needed to read the time of the update of the state, and if the difference between the time of the state update and the current time exceeds a state reporting cycle, then it is believed that the corresponding EPG server fails, and the procedure of starting up the backup EPG server is triggered.

Alternatively, when the content management system 1062 confirms that the EPG server fails, the content management system 1062 may change the state of the EPG server stored in the management end data base 1051 to being abnormal.

In step 204, if the present network EPG server fails, the content management system selects the backup EPG server for the failed present network EPG server.

In this step, if the present network EPG server fails, then the content management system 1062 selects an appropriate backup EPG server for the failed present network EPG server, and changes the state of the backup EPG server to be running.

In step 205, the content management system sends a present network EPG server failure message to the service control manager, and the message carries information of the backup EPG server distributed for the failed present network EPG server.

In this step, after the failure of the present network EPG server is detected in step 204, the content management system 1062 sends a present network EPG server failure message, specifically a Transmission Control Protocol (TCP) message, to the service control manager 1061 to notify the service control manager 1061 to switch the service on the failed EPG server to the backup EPG server; and this present network EPG server failure message includes information of the backup EPG server distributed for the failed present network EPG server, such as IP address of the backup EPG server, and the node to which the backup EPG server belongs, and so on.

In step 206, the service control manager sends an obtaining instruction message to the backup EPG server, to instruct the backup EPG server to obtain service information of the failed present network EPG server.

In this step, the service control point 1061 updates the home node of the backup EPG server in the service end data base 1051 according to the present network EPG server failure message received in step 205, and notifies the backup EPG server to obtain the service information, such as service node and multicasting address and so on, of the failed present network EPG server.

In step 207, the backup EPG server sends an obtaining response message to the service control manager after finishing obtaining the service information.

In this step, the backup EGP server obtains the whole information, and then notifies the service control manager 1061 to indicate that the backup EPG server has been in a serviceable state.

Alternatively, a timer may be set for the service control manager 1061, if an obtaining response message reported by the backup EPG server has not been received in a preset time, then it can be believed that the EPG backup device fails to update, the service control manager 1061 restores the backup EPG server node as empty in the service end data base 1051.

In step 208, the service control manager, after receiving the obtaining response message sent by the backup EPG server, sends a switching notice to the content management system to instruct the content management system to send internet protocol television service data of the failed present network EPG server through the backup EPG server.

In this step, the service control manager 1061 sends a switching notice to the content management system 1062 to notify the content management system 1062 that the backup EPG server has entered a running state, and may switch the service data of the failed present network EPG server to the backup EPG server.

Each EPG server includes two piece of information of "home group" and "home node". The home group, which is similar to the home node, also has a multi-player structure, and the home group is used for user logging in. For example, when an IPTV user in Nanjing logs in the EPG, he/she will log in an EPG server in "Nanjing group", a user in Suzhou will log in an EPG server in "Suzhou group", and the user who logs successfully will obtain subsequent service at a home node of the EPG server.

The content management system 1062 updates group information of the backup EPG server in the management end data base 1051 according to the notice, and specifically, changes the group information of the backup EPG server to be in the group where the running EPG server is located.

The above steps 201~208 realizes the mode of the backup EPG server automatically running when the present network EPG server fails. Moreover, in an example according to the present invention, the backup EPG may be triggered to be in running state by a manually operation of an engineer, the specific steps of which are as bellows.

When an engineer finds that an EPG in a certain group is overloaded (an imbalance of the development of IPTV causes an imbalance of the number of users in various regions, for example, the number of users loaded by the EPG server in the Nanjing group is greater than that of the Yancheng group and Xuzhou group and so on), the backup EPG may be triggered from a backup state to a running state by an IPTV system management background, and the content management system 1061 is notified of the information such as the node to which the backup EPG server will belongs, and then the above steps 205~208 are executed in sequence to complete the whole process. The backup EPG server will not replace a running EPG, but is only added to an overloaded group, and a user will log in the EPG to obtain a service, thus reducing the load on other servers in this group.

Moreover, for step 204, alternatively, the content management system 1062, after selecting the backup EPG server, may also further check the backup EPG to examine that whether the backup EPG could reach a fully serviceable state in a specified time, the specific process is as bellows.

The content management system 1062, after updating the state of the backup EPG server from a backup state to the running state, sets a period of waiting time, two minutes for example. If the subsequent steps 205~208 are executed smoothly, then in step 208, the control point master control end 1061 will notify the content management system 1062 to update the group information of the backup EPG; if the content management system 1062 has not received this notification message in step 208 in two minutes, it is suggested that a certain step of the subsequent steps 205~208 fails, so the state of the backup EPG is changed back to the backup state from the running state, and the switching process fails.

If the content management system 1062 has not received the notification message of "the backup EPG server reaches a fully operational state" sent from the control point master control end 1061 in step 208, then it is believed that the present working state of the backup EPG server is abnormal, and the state of the backup EPG server is changed back to the backup state, and the whole process ends.

The example of the present invention provides a method for operating an internet protocol television service system, wherein, when a present network EPG server is detected to be out of order, a backup EPG server is distributed for the present network EPG server by a content manage system, and the initialization of the backup EPG server and the switching of service in the present network EPG server are controlled automatically by a service control manager, thereby solving the problem of poor service quality caused by the fault of the present network EPG server and improving the user experience and enhancing the network reliability.

Figure 3:
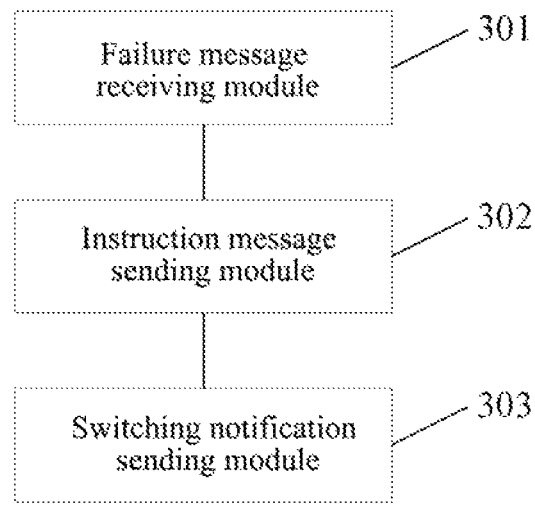
FIG. 3 is a schematic diagram of a structure of a service control manager provided by an example according to the present invention.

An example of the present invention also provides a service control manager, as shown in FIG. 3, the service control manager comprising:

a failure message receiving module 301, which is configured to receive a present network EPG server failure message sent by a content management system, this message carries information of a backup EPG server distributed for the failed present network EPG server;

an instruction message sending module 302, which is configured to send an obtaining instruction message to the backup EPG server to instruct the backup EPG server to obtain the service information of the failed present network EPG server;

a switching notification sending module 303, which is configured to: after receiving an obtaining response message sent by the backup EPG server, send a switching notification to the content management system, to instruct the content management system to send an internet protocol television service data of the failed present network EPG server through the backup EPG server.

Figure 4:
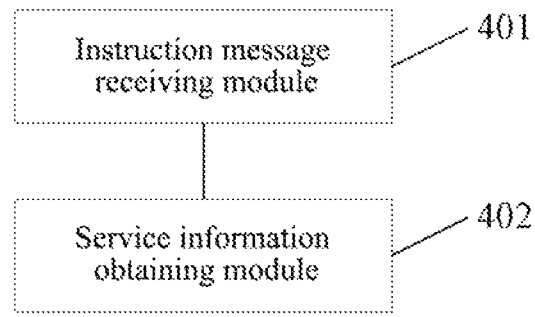
FIG. 4 is a schematic diagram of a structure of an EPG server provided by an example according to the present invention.

An example of the present invention also provides an EPG server, as shown in FIG. 4, comprising:

a instruction message receiving module 401, which is configured to receive an obtaining instruction message sent by a service control manager, wherein, the message instructs the backup EPG server to obtain the service information of the failed present network EPG server;

a service information obtaining module 402, which is configured to obtain the service information of the failed present network EPG server according to the obtaining instruction message, and send an obtaining response message to the service control pint master control end after the obtaining step.

Figure 5:
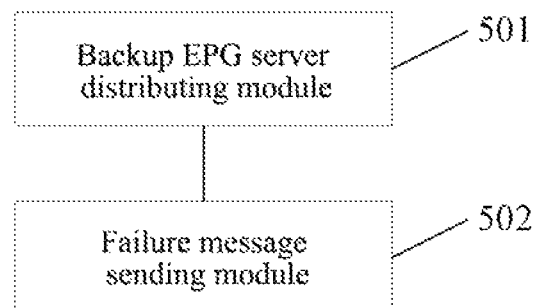
FIG. 5 is a schematic diagram of a structure of a content management system provided by an example according to the present invention.

An example of the present invention also provides a content management system, as shown in FIG. 5, comprising:

a backup EPG server distributing module 501, which is configured to: when detecting that a present network EPG server fails, distribute a backup EPG server for the failed present network EPG server;

a failure message sending module 502, which is configured to send an EPG server failure message to the service control manager, wherein, the message carries the information of the backup EPG server distributed for the failed present network EPG server.

Figure 6:
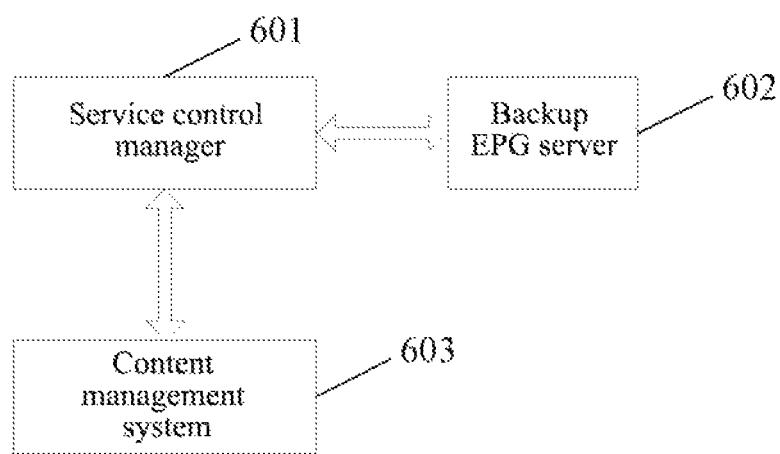
FIG. 6 is a schematic diagram of a structure of an internet protocol television service system provided by an example according to the present invention.

An embodiment of the present invention also provides an internet protocol television service system, as shown in FIG. 6, comprising a service control manager 601, a backup EPG server 602 and a content management system 603;

the service control manager 601 is configured to receive a present network EPG server failure message sent by the content management system 603, wherein the message includes the information of the backup EPG server 602 distributed for the failed present network EPG server, send an obtaining instruction message the backup EPG server 602 to instruct the backup EPG server 602 to obtain the service information of the failed present network EPG server;

the backup EPG server 602 is configured to receive an obtaining instruction message sent by the control point master control end 601, wherein the message instructs the backup EPG sever 602 to obtain the service information of the failed present network EPG server, and obtain the service information of the failed present network EPG server according to the obtaining instruction message, and send an obtaining response message to the service control manager 601 after finishing obtaining the service information;

the content management system 603 is configured to: when detecting that a present network EPG server fails, distribute a backup EPG server 602 for the failed present network EPG server, and send an EPG server failure message to the service control manager 601, wherein the message carries information of the backup EPG server 602 distributed for the failed present network EPG server.

The above apparatus and internet protocol television service system may be combined with the method for operating an internet protocol television service system provided by the example of the present invention. When a present network EPG server is detected to be out of order, a backup EPG server is distributed for the present network EPG server by a content manage system, and the initialization of the backup EPG server and the switching of service in the present network EPG server are controlled automatically by a service control manager, thereby solving the problem of poor service quality caused by the fault of the present network EPG server and improving the user experience and enhancing the network reliability. Those skilled in the art may understand that the whole or part of steps for realizing the methods in the above embodiments may be accomplished by programmers instructing relevant hardware, the programmers may be stored in some computer readable storage medium, during the execution of the programmer, any one or combination of steps of the embodiments according to the present invention may be included.

Moreover, each function unit in each embodiment according to the present invention may be realized in form of hardware, or may be realized in form of software function modules. The integrated modules may also stored in some computer readable storage medium if is realized in form of software function module and soled or used as separate products.

The above-mentioned storage medium may be a read-only storage, disk or a compact disk, and the like.

The above description is only a specific embodiment of the present invention, however the protection scope of the present invention is not limited to it, changes and alternatives within the technical scope disclosed according to the present invention which are easily thought by any one familiar with the technical field should all fall into the protection scope of the present invention. Therefore the protection scope of the present invention should be based on the protection scope described by the appending claims.

INDUSTRIAL APPLICABILITY

The example of the present invention provides a method for operating an internet protocol television service system, wherein, when a present network EPG server is detected to be out of order, a backup EPG server is distributed for the present network EPG server by a content manage system, and the initialization of the backup EPG server and the switching of service in the present network EPG server are controlled automatically by a service control manager, thereby solving the problem of poor service quality caused by the fault of the present network EPG server and improving the user experience and enhancing the network reliability.

What is claimed is:

1. A method for operating an internet protocol television service system, comprising:
    a service control manager receiving a present network electronic programmer guide (EPG) server failure message sent by a content management system, wherein the message is a TCP message, wherein, information of a backup EPG server distributed for the failed present network EPG server is carried in the present network EPG server failure message;
    the service control manager sending an obtaining instruction message to the backup EPG server to instruct the backup EPG server to obtain service information of the failed present network EPG server, wherein the service information includes at least the information of content delivery nodes and an IP address of the backup EPG server;
    wherein after the backup EGP server obtains the whole service information of the failed present network EPG server, the backup EPG server notifies the service control manager that the backup EPG server has been in a serviceable state; and
    the service control manager sets a timer for receiving an obtaining response message sent by the backup EPG server, and sending a switching notification to the content management system to instruct the content management system to send internet protocol television service data of the failed present network EPG server through the backup EPG server.

2. The method according to claim 1, further comprising:
    if the service control manager has not received the obtaining response message in a response duration, the service control manager give up using the backup EPG server which is thought to be out of order.

3. The method according to claim 1, before the step of the service control manager receiving a present network EPG server failure message, further comprising:
    the content management system, when detecting that the present network EPG server fails, distributing the backup EPG server for the failed present network EPG server; and
    the content management system sending the EPG server failure message to the service control manager, wherein the EPG server failure message carries information of the backup EPG server distributed for the failed present network EPG server;
    the content management system receiving the switching notification sent by the service control manager, wherein the switching notification instructs the content management system to send the internet protocol television service data of the failed present network EPG server through the backup EPG server, after the backup EGP server obtains the whole service information of the failed present network EPG server, the backup EPG server enters into a serviceable state, wherein the service information includes at least the information of service nodes and broadcast addresses; and
    the content management system sending the internet protocol television service data of the failed present network EPG server through the backup EPG server.

4. The method according to claim 3, wherein, the step of the content management system distributing the backup EPG server for the failed present network EPG server when detecting that the present network EPG server fails comprises:
    the content management system, when detects that the present network EPG server fails, selecting an idle backup EPG server, and setting state of the backup EPG server as being running.

5. A service control manager, comprising at least one hardware processor executing a failure message receiving module, an instruction message sending module and a switching notification sending module, wherein:
    the failure message receiving module is configured to:
        receive a present network electronic programmer guide (EPG) server failure message sent by a content management system, wherein the message is a TCP message, wherein the present network electronic programmer guide (EPG) server failure message carries information of a backup EPG server distributed for the failed present network EPG server;
    the instruction message sending module is configured to:
        send an obtaining instruction message to the backup EPG server to instruct the backup EPG server to obtain service information of the failed present network EPG server, wherein the service information includes at least the information of content delivery nodes and an IP address of the backup EPG server;
    wherein after the backup EGP server obtains the whole service information of the failed present network EPG server, the backup EPG server notifies the service control manager that the backup EPG server has been in a serviceable state; and
    the switching notification sending module is configured to set a timer for receiving an obtaining response message sent by the backup EPG server, and send a switching notification to the content management system to instruct the content management system to send internet protocol television service data of the failed present network EPG server through the backup EPG server.

6. An internet protocol television service system, comprising at least one hardware processor executing a service control manager, a backup electronic programmer guide (EPG) server and a content management system, wherein:
the service control manager is configured to: receive a present network EPG server failure message sent by the content management system, wherein the message is a TCP message, wherein the EPG server failure message carries information of the backup EPG server distributed for a failed present network EPG server; send an obtaining instruction message to the backup EPG server to instruct the backup EPG server to obtain service information of the failed present network EPG server, wherein the service information includes at least the information of content delivery nodes and an IP address of the backup EPG server;
the backup EPG server is configured to: receive the obtaining instruction message sent by the service control manager, wherein the obtaining instruction message instructing the backup EPG server to obtain service information of the failed present network EPG server, and obtain the service information of the failed present network EPG server according to the obtaining instruction message, and send an obtaining response message within a set time to the service control manager after finishing obtaining the service information;
the content management system comprises:
a backup EPG server distributing module, which is configured to: when detecting that the present network EPG server fails, distribute the backup EPG server to the failed present network EPG server; and
a failure message sending module, which is configured to: send the EPG server failure message to the service control manager, wherein the EPG server failure message carries information of the backup EPG server distributed for the failed present network EPG server;
wherein after the backup EGP server obtains the whole service information of the failed present network EPG server, the backup EPG server notifies the service control manager that the backup EPG server has been in a serviceable state.

* * * * *